Sept. 28, 1965         K. R. LAGLER         3,208,304
LIMITED FORCE TRANSMITTING APPARATUS
Filed July 24, 1963         2 Sheets-Sheet 1
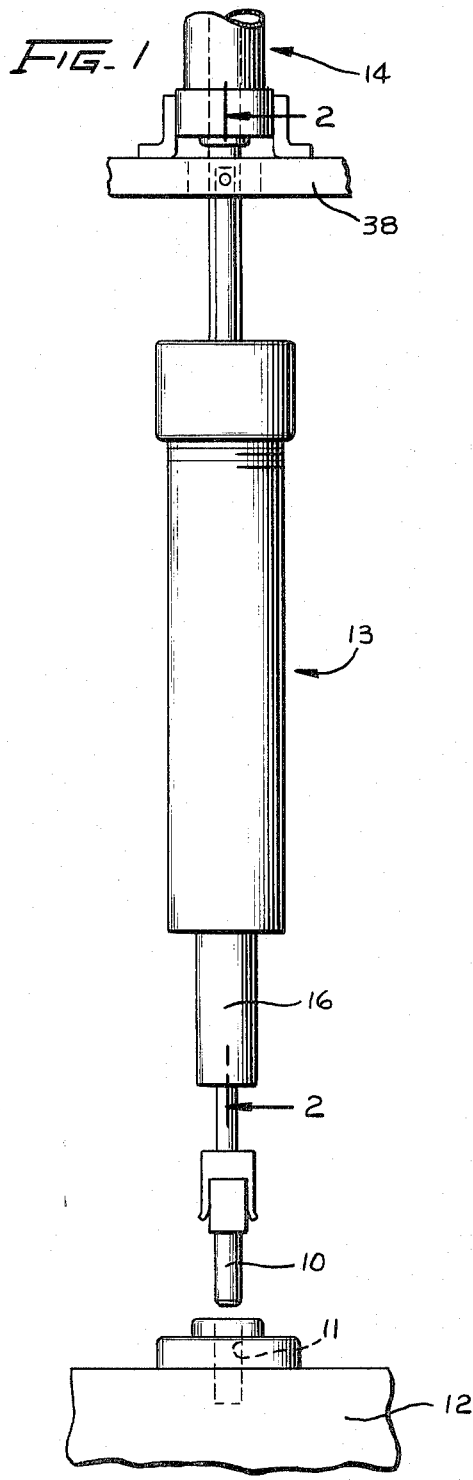
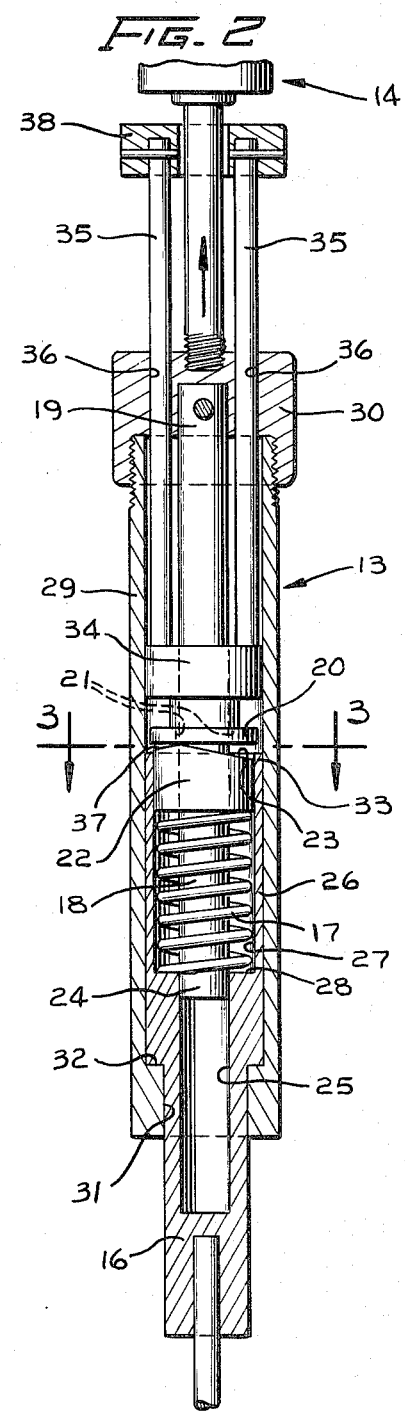
INVENTOR
K. R. LAGLER
BY
ATTORNEY

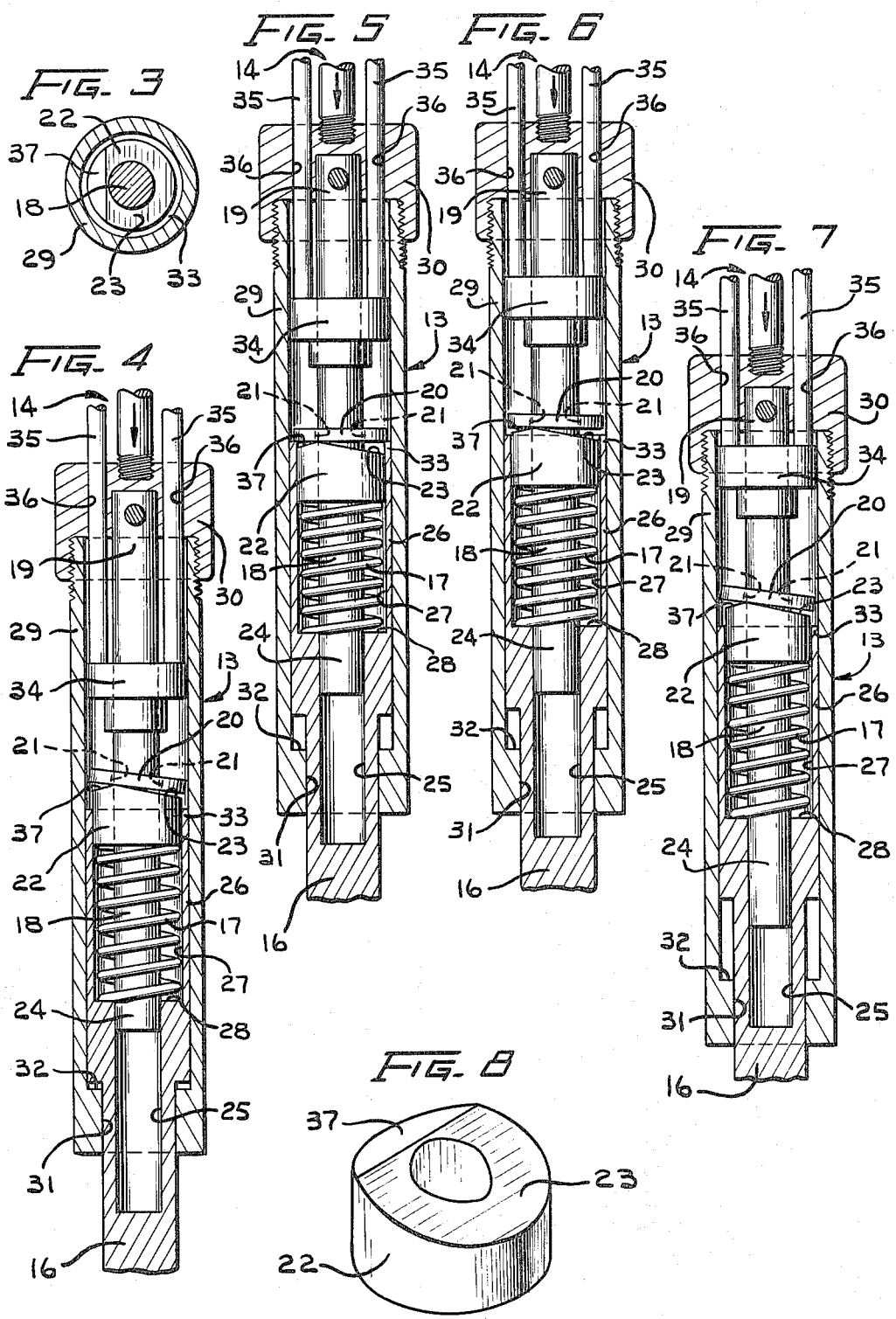

United States Patent Office 3,208,304
Patented Sept. 28, 1965

3,208,304
LIMITED FORCE TRANSMITTING APPARATUS
Karl R. Lagler, Indianapolis, Ind., assignor to Western Electric Company, Incorporated, New York, N.Y., a corporation of New York
Filed July 24, 1963, Ser. No. 297,356
7 Claims. (Cl. 74—584)

The present invention relates generally to apparatus for transmitting force to an object in such a manner that the force transmitted never exceeds a selected magnitude. More specifically, the invention is directed to apparatus for transmitting a force from a driving member, which moves through a prescribed stroke, to a driven member, whose movement may be blocked, while restricting the transmitted force to a predetermined value. The general objects of the invention are to provide new and improved apparatus of such character.

In various automatic assembling operations it is required that articles be inserted into apertures or receiving seats in a carrier, such as a work holder, nest, or subassembly. In the case of fragile articles or carriers, the inserting operation must be performed with reasonable delicacy so that neither the article nor the receiving element, or both, is deformed or broken if the article is misaligned or is otherwise prevented from entering the prescribed opening. A simple spring or other resilient means is commonly provided to cushion the application of force, but as the spring is compressed the force exerted thereby continuously increases. Furthermore, if the spring is not long enough for the stroke of the driving or seating member, a rigid drive results. A spring which does closely approximate a constant force biasing member under given circumstances would, in many cases, be of such length as to be impractical.

It is another object of the invention to provide new and improved apparatus for transmitting a substantially constant force from a driving member to a driven member in spite of substantial relative movement of the two members.

Another object of the invention is to provide new and improved apparatus, including a spring, for transmitting force from a driving member to a driven member wherein energization of the spring, and hence the force transmitted to the driven member, is limited to a prescribed value in spite of relative movement of the two members.

A further object of the invention is to provide a new and improved resilient mechanism for exerting a normal resilient biasing force not exceeding a selected point of deflection, and thereafter exerting a substantially constant biasing force regardless of continued movement of a member tending further to deflect the same, thus promoting an effect superior to that of a long spring.

Apparatus in accordance with the invention and accomplishing the above-stated objects includes a resilient means normally transmitting force from a driving member to a driven member. Releasable stop means associated with one of the members, precludes movement of the resilient means relative to that one member as long as the force transmitted does not exceed a selected magnitude, but permits such movement when the force reaches the selected magnitude. In this manner, the force transmitted to the object never exceeds the selected magnitude.

In accordance with a preferred embodiment of the invention, the above-mentioned one member consists of a shaft, and the releasable stop means includes a washer having an aperture, which washer is slidably received on the shaft. The aperture in the washer is substantially larger than the shaft so that the washer is movable along the shaft when the washer is substantially perpendicular thereto, and so that the washer may be canted relative to the shaft and become immovable therealong. Mechanism is provided for canting the washer relative to the shaft so long as the force transmitted does not exceed the selected magnitude, and for righting the washer to an attitude substantially perpendicular to the shaft when the transmitted force reaches the selected magnitude.

Other objects, advantages and aspects of the invention will be apparent from the following detailed description of a specific embodiment thereof when taken in conjunction with the appended drawings in which:

FIG. 1 is an elevational view of a specific embodiment of the invention utilized in a preferred application;

FIG. 2 is an enlarged sectional view of the specific embodiment, taken generally along the line 2—2 in FIG. 1;

FIG. 3 is an enlarged sectional view of the specific embodiment, taken along the line 3—3 in FIG. 2;

FIGS. 4 through 7 are sectional views similar to that of FIG. 2, but illustrating the apparatus in a sequence of operating positions; and FIG. 8 is a perspective view of the obliquely truncated sleeve shown in FIG. 2.

Referring now to the drawings and more particularly to FIG. 1, the illustrated embodiment is utilized to insert a piece part 10 into an opening 11 in a carrier 12. The carrier 12 may represent a plastic housing into which a metal stud (piece part 10) is to be inserted. It can readily be appreciated that such a plastic housing 12 is subject to being deformed or broken by a piece part 10 improperly aligned with the opening 11, if a rigid force, or a resilient but increasing force, is applied to the piece part to seat it in the opening. Consequently, it is most desirable that the apparatus be provided with a mechanism that absorbs any potential force which, if exerted on the piece part, would result in damage to either the carrier or the piece part. The present invention accomplishes this end by interposing a limited force transmission coupling 13 between a drive mechanism 14 and a plunger 16 engaging the piece part 10.

As shown in FIG. 2, the preferred embodiment includes a coil spring 17 which serves to transmit force from a cylindrical shaft 18, as the driving member, to the plunger 16, as the driven member. The shaft 18 is fixed at one end 19 to the drive mechanism 14 and is moved through a prescribed stroke therewith. The force of movement of the shaft 18 is transmitted to the spring 17 through a washer 20 slidably received on the shaft 18, which washer serves as a releasable stop because it has a bore 21 that is substantially larger than the shaft. The enlarged bore 21 permits the washer 20 to be canted relative to the shaft 18 and become immovable therealong when a collet 22, slidably received on the shaft and having an obliquely truncated end 23 (FIGS. 2, 3, and 8) in facing relationship with the washer, is urged thereagainst.

The spring 17 is received over the shaft 18 and bears against the collet and the plunger 16, which slidably accommodates the free end 24 of the shaft in a bore 25 of considerable depth. The spring 17 is housed in a sleeve 26 having a bore 27, this sleeve forming an extension of the plunger 16. The juncture of the bores 25 and 27 forms a shoulder 28 in the plunger for bearing against one end of the spring.

The entire coupling 13 is encased in a housing 29 fixed at one end to the drive mechanism 14, as by an end cap 30, and having a bore 31 in its free end for slidably accommodating the plunger 16. Mating shoulders of the plunger and the housing, as at 32 limit outward movement of the plunger with respect to the housing.

Operation

The spring 17 is initially compressed, by means described below, to a length such that the obliquely truncated end 23 of the collet 22 projects only a short distance beyond the free end 33 of the sleeve 26 as shown in FIGS. 2 and 3, such that it engages the washer 20. The washer 20 is thereby canted relative to the shaft 18 and therefore resists any movement of the washer and the spring 17 along the shaft 18. Consequently, the force of the drive mechanism 14 is transmitted from the shaft 18 through the washer, collet and spring to the plunger 16 to urge the piece part 10 into the opening 11.

Any resistance encountered by the piece part 10 is absorbed by further compression of the spring 17 against the canted washer 20. Thus, the spring 17 provides a resilient cushion for the plunger 16. Normally, this results in a smooth delivery of the piece part into the opening. However when a piece part becomes misaligned such that it cannot enter the carrier 12, the spring 17, unless relieved, would be excessively compressed, and perhaps bottomed, by the stroke of the drive mechanism 14 such that destructive force would be applied to the piece part 10.

To eliminate that possibility, when the spring 17 is compressed to a predetermined amount, the free end 33 of the sleeve 26 engages the washer 20 and rights it to an attitude substantially perpendicular to the shaft 18, depicted in FIG. 5. In the perpendicular attitude, the washer 20 becomes movable along the shaft 18 and, under the influence of the spring 17 in its state of compression, it is slid upward along the shaft to the position, shown in exaggerated fashion, in FIG. 6.

As soon as the washer is thus moved away from the free end of the sleeve 26, the obliquely truncated end 23 of the collet 22 causes the washer 20 to resume the canted attitude and become immovable relative to the shaft 18 as is depicted in FIG. 7. In this manner, the spring 17 can never be compressed beyond the point that the free end of the sleeve 26 engages the washer 20. Thus, the limited force transmission coupling 13 insures that force transmitted thereby never exceeds a selected magnitude, in that when the spring 17 is compressed the predetermined amount, the movement of the drive mechanism 14 is compensated for by displacement of the washer 20 and relief of the spring 17.

The length of the bore 27 of the sleeve 26, the axial length of the collet 22, and the dimensions and characteristics of the spring 17 are determinative of the magnitude of force at which relief of the spring 17 occurs. These parameters can be calculated to provide any selected maximum force, and the coupling 13 will transmit no force greater than that magnitude despite continued movement of the shaft 18 through the prescribed stroke. The continued movement of the shaft 18, after the selected magnitude of force has been reached merely causes the spring 17 to be compressed and expanded alternately in minute amounts such that the force transmitted remains nearly constant at the selected magnitude of force, the washer 20 alternately assuming the canted and perpendicular attitudes of FIGS. 4 and 5, respectively, relative to the shaft 18.

It should be emphasized that once the washer 20 is righted to the substantially perpendicular attitude and becomes movable relative to the shaft 18, the spring 17 immediately expands and projects the truncated end 23 of the collet 22 beyond the end 33 of the sleeve 26 to cant the washer relative to the shaft again. Thus, the magnitudes of the force transmitted by the coupling 13, after the selected magnitude has been reached, oscillate between the selected magnitude and a slightly lesser magnitude, such that the force transmitted to the piece part remains substantially constant at the selected magnitude. In this manner, the coupling 13 produces an effect superior to that of even an impractically long compression spring without the problems attendant thereto.

It has been found that the collet 22 is most effective in both pushing and canting the washer 20 if the point at which the canting force is applied to the washer is in close proximity to the shaft. This may be accomplished by utilizing a collet of small diameter or by utilizing a larger collet 22, such as the one illustrated in FIGS. 2, 3, and 8, and fabricating the obliquely truncated end 23 thereof with a relieved portion 37. With such provision, the point of application of the canting force is brought in close proximity to the guide shaft 18, thereby decreasing its moment arm on the washer 20 so that a sizable component of the force is directed axially along the shaft 18, sufficient in magnitude to slide the washer a short distance up the shaft before the washer is fully canted. As a further feature of such construction, the bending moment tending to deform the washer 20 is minimized; consequently, the mechanism undergoes less wear and has a longer life.

Following an operating cycle during which the apparatus has been required to yield in the manner described it is necessary that the washer 20 (with the collet 22, spring 17, and plunger 16) be returned to its initial position, shown in FIG. 2, along the shaft 18. In the illustrated embodiment a collar 34 is slidably mounted on the shaft 18 on the opposite side of the washer 20 from the collet 22. The collar 34 may be moved relative to the shaft 18 by a pair of arms 35—35 fixed at one end to the collar with their lengths extending through openings 36—36 in the end cap 30 and fixed at their remote ends to a stationary member, such as the member 38 which is secured to the cylinder of the motor 14 as shown in FIG. 1.

With such an arrangement, on a return stroke of the driving mechanism 14 the collar 34 engages the washer 20, righting it to the perpendicular attitude, and pushes the washer back along the shaft 18 to its initial position. Thus, as the driving mechanism is advanced again, the collar 34 is withdrawn relative to the shaft 18 through the arms 35—35, and the spring 17 immediately forces the washer 20 to assume the canted attitude and become imovable relative to the shaft in readiness for repetition for the above-described operation.

It is important to note that though the driving member has been characterized by a cylindrical shaft and the driven member by a plunger in the above-described embodiment, the same result would obtain if they were reversed. Force applied on either the shaft or the plunger can be transmitted by the coupling 13 only as long as it does not reach the selected magnitude. Finally, while one specific embodiment is described hereinabove various modifications may be made without departing from the spirit and the scope of the invention.

What is claimed is:

1. Apparatus for transmitting force to an object such that the force transmitted never exceeds a selected magnitude, which comprises:
   a driving member;
   a driven member;
   resilient means arranged in engagement with one of said driving and said driven members;
   releasable stop means cooperable with said resilient means normally to engage said resilient means drivingly with respect to the other of said driving and driven members such that said resilient means yieldably transmits force from said driving member to said driven member, said resilient means being capable of storing energy in proportion to the force transmitted from said driving member to said driven member;
   control means responsive to the force transmitted through said resilient means for releasing said stop means momentarily when the energy stored in said resilient means is representative of the selected magnitude of transmitted force, said stop means upon being released permitting movement of said resilient means relative to said other member to partially de-energize said resilient means.

2. Apparatus for transmitting force to an object such that the force transmitted never exceeds a selected magnitude, which comprises:
- a driving member moving through a prescribed stroke;
- a driven member for engaging the object;
- resilient means arranged in engagement with one of said driving and said driven members;
- releasable stop means cooperable with said resilient means normally to engage said resilient means drivingly with respect to the other of said driving and driven members in a first condition, said resilient means yieldably transmitting force from said driving member to said driven member when said releasable stop means assumes said first condition, and said releasable stop means being movable relative to said other member in a second condition;
- control means responsive to the force transmitted through said resilient means for maintaining said releasable stop means in the first condition so long as the force transmitted through said resilient means does not exceed the selected magnitude, and for causing said releasable stop means automatically to assume the second condition when the transmitted force reaches the selected magnitude to permit movement of said resilient means relative to said other member to partially de-energize said resilient means.

3. Apparatus for transmitting force to an object such that the force transmitted never exceeds a selected magnitude even though movement of the object may be blocked, which comprises:
- a driving member moving through a prescribed stroke;
- a driven member for engaging the object;
- resilient means arranged in engagement with one of said driving and said driven members;
- releasable stop means cooperable with said resilient means normally to engage said resilient means drivingly with respect to the other of said driving and driven members in a first attitude, said resilient means yieldably transmitting force from said driving member to said driven member when said releasable stop means assumes said first attitude, and said releasable stop means being movable relative to said other member when a second attitude is assumed with respect thereto; and
- control means responsive to the force transmitted through said resilient means for maintaining said releasable stop means in the first attitude and drivingly engaged with said other member so long as the force exerted through said resilient means does not exceed the selected magnitude, and for causing said releasable stop means automatically to assume the second attitude and become movable relative to said other members when the transmitted force reaches the selected magnitude, to permit partial de-energization of said resilient means.

4. The apparatus as recited in claim 3, wherein:
said other member comprises a shaft; and
said releasable stop means comprises a washer having an aperture through which said washer is slidably received on said shaft, the aperture being substantially larger than said shaft so that said washer may assume a first attitude wherein said washer is canted relative to said shaft and is immovable therealong, and alternatively a second attitude wherein said washer is substantially perpendicular to said shaft and is movable therealong.

5. The apparatus as recited in claim 3, wherein:
said other member comprises a cylindrical shaft;
said releasable stop means comprises a washer slidably received on said shaft through a bore substantially larger than said shaft so that said washer may assume a first attitude wherein said washer is canted relative to said shaft and is immovable therealong, and alternatively a second attitude wherein said washer is substantially perpendicular to said shaft and is movable therealong; and
said control means comprises first means for canting said washer relative to said shaft so long as the force exerted through the resilient means does not exceed the selected magnitude, and second means for automatically righting said washer to an attitude substantially perpendicular to said shaft when such force reaches the selected magnitude;
whereby said washer may oscillate between the first and second attitudes to insure that the force exerted on the object never exceeds the selected magnitude.

6. The apparatus as recited in claim 3, wherein:
said other member comprises a cylindrical shaft;
said releasable stop means comprises a washer slidably received on said shaft through a bore substantially larger than said shaft so that said washer may assume a first attitude wherein said washer is canted relative to said shaft and is immovable therealong, and alternatively a second attitude wherein said washer is substantially perpendicular to said shaft and movable therealong;
said control means comprises in part a collet having a bore therethrough and an obliquely truncated end, said collet being slidably received over a free end of said shaft with the obliquely truncated end in facing relationship with said washer;
said resilient means comprises a coiled spring which is slidably received on said shaft and engaged with the other end of said truncated collet;
said one of said members is provided with a bore for slidably receiving the free end of said shaft;
whereby compression of said spring forces the truncated end of said collet against said washer to cant the same into driving engagement with said shaft such that the force of movement of said driving member is transmitted through said spring to said driven member to urge the object through the prescribed stroke; and
said control means further comprises in part, means mounted on said one member and extending along said shaft for engaging and righting said washer to an attitude substantially perpendicular to said shaft when said spring has been compressed an amount corresponding to the selected magnitude of transmitted force so that said washer becomes movable relative to said shaft and excessive force is not transmitted to the object.

7. Apparatus for transmitting force to an object such that the force transmitted never exceeds a selected magnitude and such that once the selected magnitude is reached the transmitted force remains substantially constant at that magnitude, which comprises:
- a cylindrical shaft moving through a prescribed stroke;
- a washer slidably received over a free end of said shaft and having a bore substantially larger than said shaft so that said washer may assume a first attitude wherein said washer is canted relative to said shaft and is immovable therealong, and alternatively a second attitude wherein said washer is substantially perpendicular to said shaft and is movable therealong;
- a collet having a bore therethrough and an obliquely truncated end, said collet being slidably received over the free end of said shaft with the obliquely truncated end in facing relationship with said washer;
- a coiled spring slidably received over the free end of said shaft in engagement with the other end of said collet;
- a driven member for engaging the object and urging movement thereof through the prescribed stroke, said member having a bore for slidably accommodating the free end of said shaft;
- whereby movement of said shaft relative to said driven member causes said coiled spring to urge the obliquely truncated end of said collet against said washer to cant said washer to the first attitude such that the force of movement of said shaft is transmitted to said driven member to urge the object through the prescribed stroke; and a sleeve formed integrally at one end of said driven member and extending along said shaft toward said washer to provide a housing for said spring and said collet, said sleeve being operable to engage and to right said washer to the second attitude when the force transmitted by said spring reaches the selected magnitude so that said washer becomes movable along said shaft;

whereby said washer may oscillate between the first and second attitudes to relieve excessive energization of said spring so that the force transmitted to the object does not exceed the selected magnitude.

References Cited by the Examiner
UNITED STATES PATENTS 2,933,950   4/60   Isaac _____ 74—584

FOREIGN PATENTS 831,948   4/60   Great Britain.

BROUGHTON G. DURHAM, *Primary Examiner.*

MILTON KAUFMAN, *Examiner.*